Oct. 24, 1950 — G. S. FRAMBES — 2,526,814
RECIPROCATING BLADE LAWN MOWER
Filed May 9, 1947 — 2 Sheets-Sheet 1

Inventor
G. Stark Frambes
By W. S. McDowell
Attorney

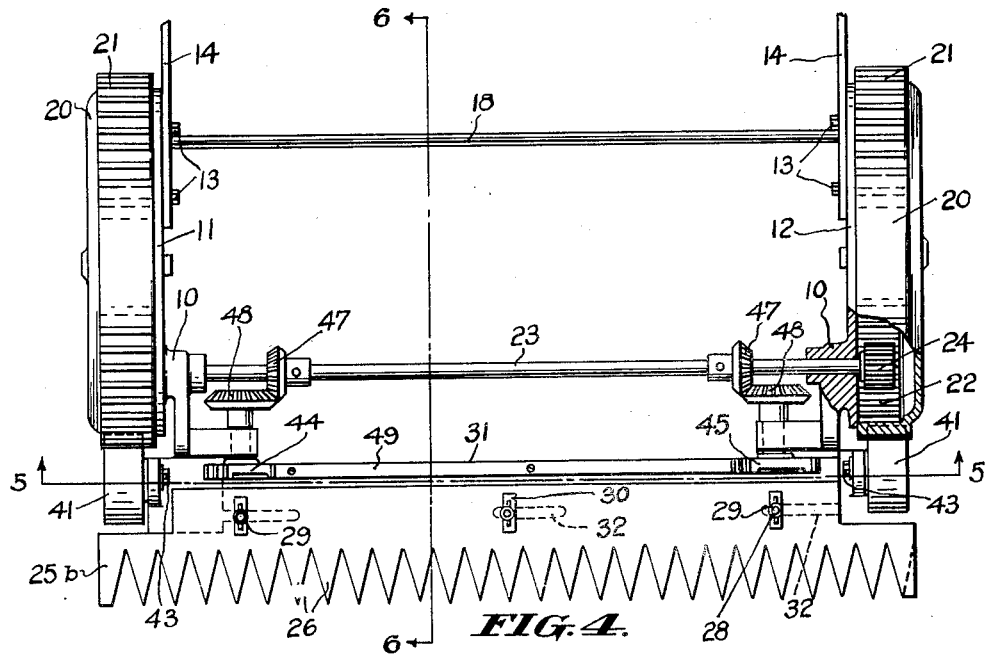

Patented Oct. 24, 1950

2,526,814

UNITED STATES PATENT OFFICE 2,526,814

RECIPROCATING BLADE LAWN MOWER

Gordon Stark Frambes, Columbus, Ohio

Application May 9, 1947, Serial No. 746,981

4 Claims. (Cl. 56—258)

My invention relates to lawn mowers, and more particularly to lawn mowers of the type employing transversely reciprocable cutting blades.

In the past, many lawn mowers of this type have been employed, but in most instances have been subject to various objections, due largely to mechanical inefficiency, structural complexity, and difficulties in operation and manufacture. Foremost among the difficulties encountered with lawn mowers of this type, was the frictional drag and unevenness ambient to the driving mechanism employed to effect the reciprocating movement of the associated cutter blade, it being understood, that in such types it is necessary to obtain a relatively high speed movement of the cutting blade in order to efficiently cut the grass of a lawn or field. Also, in the operation of such lawn mowers, the cutting blades were oftentimes damaged or broken by the entrance of a stone or stick within the blades, and such damage normally resulted in the necessity of replacing relatively expensive and complicated parts.

It follows therefore, that the primary object of my invention is to generally improve upon lawn mowers of this type by providing mechanically efficient and structurally simple driving means for imparting the necessary reciprocating movement to the associated cutter blade with a minimum of frictional drag, and to eliminate unevenness encountered by such movement.

It is another object of my invention to provide a lawn mower of the reciprocating-blade type in which the various component parts may be quickly and easily assembled or disassembled for cleaning, repair or replacement; and which employs relatively inexpensive cutting blades which may be easily replaced or sharpened as the occasion arises.

For a further and more detailed understanding of my invention and the various objects and advantages gained thereby, reference is made to the following description and the appended drawings wherein:

Fig. 4 is a top plan view of a modified form of lawn mower formed in accordance with this invention;

Fig. 5 is a vertical sectional view taken along the line 5—5 of Fig. 4;

Fig. 6 is a vertical sectional view taken along the line 6—6 of Fig. 4.

Figure 1:
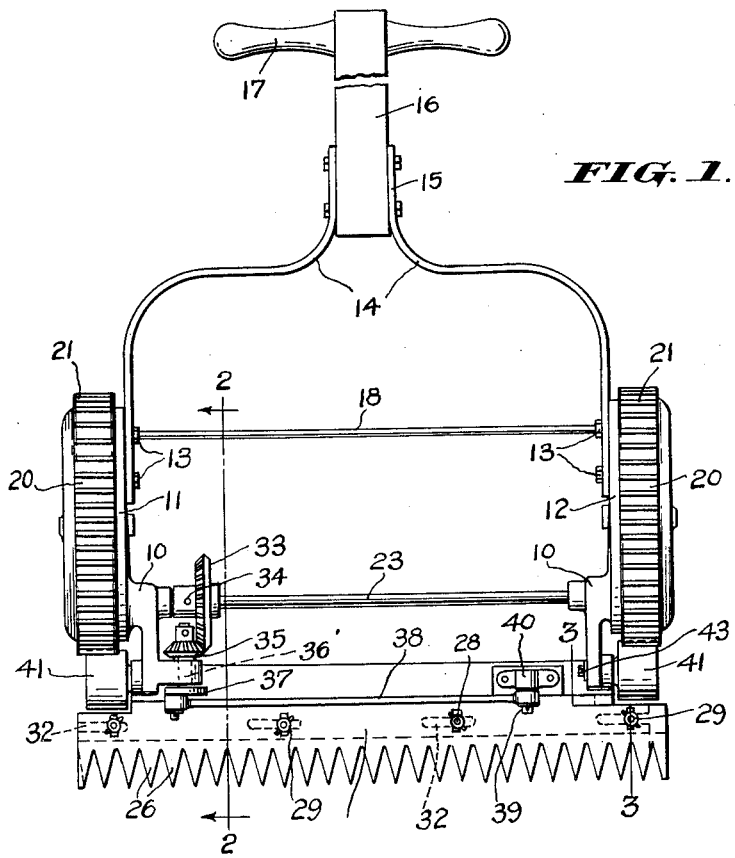
Fig. 1 is a top plan view of a lawn mower formed in accordance with this invention.
Figures 2, 3:
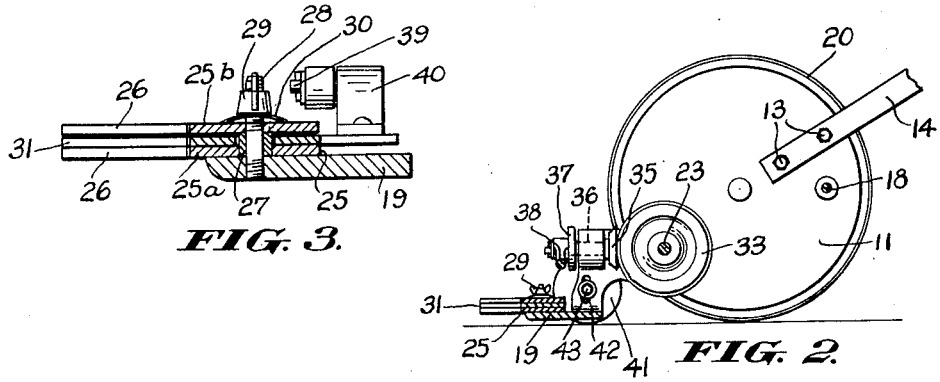
Fig. 2 is a vertical sectional view taken along the line 2—2 of Fig. 1.
Fig. 3 is a similar view taken along the line 3—3 of Fig. 1.

Referring now to the drawings, and more particularly to Figs. 1 through 3 thereof, the lawn mower illustrated therein comprises a frame, generally indicated by the numeral 10 and including a pair of transversely spaced circular side plates 11 and 12 respectively. Secured to the individual side plates by means of fastening bolts 13, is a rearwardly and diagonally extending fork 14, which receives, as at 15, the inner end of a steering tongue 16 which is provided at its upper end in the usual manner with a cross-bar handle 17. The side plates of the frame are joined at their rearward ends by means of a cross bar 18 which serves to rigidly maintain the side plates in their spaced condition. Support is afforded the forward end of the frame by means of a transversely disposed plate 19 which is positioned in a forwardly projecting manner with respect to the side plates 11 and 12. Positioned at either side of the frame in transverse alignment, and rotatably secured to each of the side plates, are ground wheels 20, each of which is formed upon its outer peripheral surface with friction lugs 21, and in the normal manner upon its inner surface with a band gear or gear teeth 22. Rotatably carried within the frame 10, is a transversely extending shaft 23 which is provided at its outer ends with gears 24 positioned in meshing engagement with the band gears formed upon the inner surface of the ground wheels 20, and which upon rotation of the ground wheels, serve to impart a consequent rotation to the shaft 23.

Detachably secured to the forwardly extending cross plate 19 of the frame and extending forwardly therefrom, is a stationary cutting blade 25 which comprises a pair of spaced upper and lower plates, 25a and 25b respectively, the latter being formed at their leading edges with a plurality of pointed teeth 26. The two plates of the blade 25 are held in vertically spaced relation by means of circular collars 27 which extend through openings in the lower plate 25a, and which abut the upper surface of the cross plate 19 and the lower surface of the upper plate 25b. The collars are carried upon a plurality of threaded bolts or lugs 28 which are held in threaded engagement with the lower cross plate 19 of the frame, and which serve to secure, by means of wing nuts 29, the upper and lower plates of the stationary blade. To provide a degree of resiliency between the upper and lower plates of the blade, a like number of bow springs 30 are interposed between the wing nuts 29 and the upper surface of the upper plate 25b. The bow springs 30 serving to maintain the upper and lower blades in a resiliently separable condition, and to allow resilient parting movement in the event a rock or stick becomes lodged between the two plates. A reciprocable cutter blade 21 is positioned between the upper and lower plates of the stationary blade 25, and is provided with longitudinally disposed slots 32 through which the collars 27 are positioned in order that a limited transverse sliding movement of the reciprocating cutter blade 31 may be obtained. Friction between the reciprocable blade 31 and the stationary blade 25 is limited to the weight of the former acting upon the upper surface of the lower plate 25a, as the upper plate 25b is maintained in fixed spaced relation to the lower plate by means of the collar 27. The outer edge of the reciprocable blade 31 is also formed with saw teeth corresponding in dimensions to the teeth 26 disposed at the leading edge of the stationary blade, and as sliding movement obtains within the cutter blade, the teeth thereof will move into and out of registration with the stationary teeth 26, and it will be seen that blades of grass passing through the stationary blade will be severed by the transverse reciprocating action of the cutter blade 31. The rearward edge of the blade 31 is formed so as to extend rearwardly of the stationary blade 25, and is cut away at its rearward corners to insure ample clearance during reciprocating movement between the blade and the associated frame members.

Reciprocating movement is imparted to the cutter blade 31 through a system of gears driven by the rotatable shaft 23, which in turn is driven upon rotation of the associated ground wheels 20. The gearing system comprises a bevel gear 33 which is suitably mounted upon the rotatable shaft 23, by means of a pin or key 34. The latter bevel gear, in turn, engages a relatively smaller bevel gear 35 carried at the end of a second rotatable shaft 36 which is disposed within the frame 10 in perpendicular relation to the first shaft 23. The second shaft 36 carries at its opposite end a crank arm 37, to which is pivotally connected the inner end of a connecting rod 38. The connecting rod 38 in turn extends diagonally across the forward portion of the lawn mower, and is connected as at 39 to a bracket mounting 40 carried upon the rearward edge of the reciprocating blade 31. In this manner, it will be seen that upon rotation of the ground wheels 20, reciprocating movement at relatively high speeds is imparted to the reciprocating cutter blade 31, in order that the same will move transversely between the stationary blade 25.

Means for elevating the blades 25 and 31 to a desired height with respect to the ground is accomplished by a second pair of ground wheels or rollers 41, which are rotatably mounted within slots 42 formed within upright portions of the frame 10 which carry the cross plate 19, the rollers being disposed just forwardly of the larger ground wheels 20 and between the latter and the rearward edge of the blade 25. To vary the height of the blades with respect to the ground, adjustment is afforded the rollers 41 by means of tensioning or clamping nuts 43 carried at the inner side of the axle of the rollers, and engageable with the frame at the inner side of the slot 42. The latter provision provides a convenient means for adjusting the height of the cut grass, which may be varied over a relatively wide range from a very close cut to a height approximating two inches. Further, the rollers 41 prevent the blade from digging into the ground, in the event uneven terrain is encountered.

Figs. 4 through 6 of the drawing disclose a modified form of the present invention wherein, the driving mechanism for the associated reciprocating blade 31 is accomplished by means of a pair of segmental pinion gears 44 and 45 respectively. Each of these pinion gears are disposed at the ends of a pair of secondary driven shafts 46 disposed perpendicularly to the shaft 23 driven by the ground wheel 20. Instead of a single bevel gear 33, a pair of bevel gears 47 are keyed to the shaft 23, and are maintained in meshing engagement with a similar number of bevel gears 48 which serve to impart rotation to the shaft 46. The bevel gears 47 are disposed upon the shaft 23 in opposite relation, in order to provide opposite rotation to each of the shafts 46 upon rotation of the ground wheels 20. In this modified form, the rear surface or edge of the cutting blade 31 is provided with a segmental rack gear 49, and as rotation is imparted to the individual segmental pinions 44 and 45, which are disposed in "out of phase" relation to one another, meshing engagement is obtained between one segment of each gear and one segment of the rack gear 49. Due to the opposite rotation of the two segmental pinion gears, a reciprocating movement is imparted to the rack bar and consequently to the cutting blade 31. When the segmental pinions are properly positioned upon their respective shafts, a substantially continuous reciprocating movement is obtained within the rack gear 49, with one of the pinions sliding the rack gear in one direction, and the other of the pinions returning the same to its original position instantaneously upon release of the first pinion. In this manner, it will be seen that one complete revolution of the pinions will impart a two cycle reciprocating movement to the associated rack gear 49 and its cutter blade, and if the phase or angular disposition of the two pinions is properly adjusted, a substantially constant torque within the rack gear 49 will be obtained.

In both forms of the present invention, protection for the forwardly projecting cutter blades may be had by means of a forwardly projecting guard which, as shown in Fig. 6 of the drawings, may take the form of a number of forwardly projecting metallic fingers 50, corresponding in number with the number of teeth formed at the forward edge of the stationary blade 25. These fingers may be advantageously secured to the stationary cross plate 19 of the frame, or may in any suitable manner be connected with one of the plates comprising the stationary blade 25, it being manifest that the fingers are maintained in registration or alignment with the points of the teeth of the blades in order that relatively small stones or sticks may be deflected prior to entering the grooved portions of the teeth.

In view of the foregoing, it will be seen that my invention provides both a mechanically efficient and structurally simple lawn mower construction utilizing a transversely reciprocating cutter blade. The associated mechanism is characterized by its decreased frictional drag and its smooth and even operation in imparting the necessary reciprocating movement to the associated cutting blade. In a preferred form, the blades of the lawn mower may be easily disassembled by means of the associated wing nuts, for sharpening, repair or replacement and cleaning. Due to the structural simplicity of lawn mowers formed in accordance with this invention, the cost of manufacture of the same is greatly reduced over previous types.

While I have disclosed what I now deem to be preferred forms of my invention, it will be manifest that various modifications in details of construction and design may be accomplished without departing from the spirit of the invention or the scope of the following claims.

I claim:

1. In a reciprocating blade lawn mower of the type having a frame, ground wheels rotatably carried at either side of the frame, a shaft driven by rotation of the ground wheels, and a flat cutter blade slidably carried on said frame in advance of said ground wheels for reciprocating movement transversely of said frame; a rack gear mounted longitudinally on said blade; a pair of segmental pinion gears rotatably carried in transversely spaced relation on said frame and having teeth alternately engageable with said rack gear to impart reciprocating movement to said cutter blade; and means drivingly connected between said shaft and said pinion gears for imparting rotation to said pinion gears in opposite directions.

2. In a reciprocating blade lawn mower of the type provided with a frame, ground wheels rotatably carried at either side of said frame, a shaft driven by rotation of said ground wheels and extending transversely across said frame, and a cutter blade carried in advance of said ground wheels and arranged for transverse reciprocating movement with respect to said frame; a rack gear carried by said blade longitudinally thereof; a plurality of oppositely rotating segmental pinion gears journalled on said frame for rotation in a plane perpendicular to the plane of movement of said cutter blade and having gear teeth thereon alternately engageable with said rack gear to impart reciprocating movement to said blade; and drive means connected between said shaft and said pinion gears for imparting rotation to said pinion gears in opposite directions upon rotation of the ground wheels of said lawn mower.

3. In a reciprocating blade lawn mower of the type provided with a frame, ground wheels rotatably carried at either side of said frame, a shaft driven by rotation of said ground wheels and extending transversely across said frame, and a cutter blade carried in advance of said ground wheels and arranged for transverse reciprocating movement with respect to said frame; a rack gear carried by said blade longitudinally thereof; a plurality of oppositely rotating segmental pinion gears journalled on said frame for rotation in a plane perpendicular to the plane of movement of said cutter blade and having gear teeth thereon alternately engageable with said rack gear to impart reciprocating movement to said blade; and drive means connected between said shaft and said pinion gears for imparting rotation to said pinion gears in opposite directions upon rotation of the ground wheels of said lawn mower, said last-named means comprising stub shafts carried by each of said pinion gears, a first set of bevel gears carried by said stub shafts, and a second set of bevel gears carried by said first-named shaft and meshing with said first set of bevel gears.

4. In a lawn mower; a frame, a pair of ground wheels journalled in said frame, a drive shaft extending transversely across said frame and connected to be driven upon rotation of said ground wheels, a first pair of oppositely facing bevel gears carried in longitudinally spaced relation on said shaft, a second pair of bevel gears arranged for rotation in a plane perpendicular to said first set of bevel gears and carried in meshing engagement therewith, shafts carried by each of said second pair of bevel gears, a pair of segmental pinion gears carried by said shafts and rotatable in opposite directions upon rotation of said ground wheels, a flat cutter blade arranged in advance of said frame for reciprocating movement in a substantially horizontal plane, and a rack gear mounted on said blade in the plane of rotation of said pinion gears and having teeth thereon to be alternately engaged by the segments of said pinion gears upon rotation thereof, whereby to impart reciprocating movement to said rack gear and said blade.

G. STARK FRAMBES.

REFERENCES CITED

The following references are of record in the file of this patent:

UNITED STATES PATENTS

| Number | Name | Date |
|---|---|---|
| 482,752 | Prindle | Sept. 20, 1892 |
| 632,173 | Cameron | Aug. 29, 1899 |
| 889,363 | Gaefcke | June 2, 1908 |
| 1,000,393 | Felker | Aug. 15, 1911 |
| 1,586,143 | Cooper | May 25, 1926 |
| 2,110,071 | Pociecha | Mar. 1, 1938 |